United States Patent
Schultz et al.

(10) Patent No.: US 6,795,903 B2
(45) Date of Patent: Sep. 21, 2004

(54) SYSTEM AND METHOD FOR SEARCHING FOR DUPLICATE DATA

(75) Inventors: Mark Alan Schultz, Carmel, IN (US);
Shu Lin, Indianapolis, IN (US);
Michael Gene Kelly, Fishers, IN (US)

(73) Assignee: THOMAS Licensing S.A., Boulogne-Billancourt (FR)

(*) Notice: Subject to any disclaimer, the term of this patent is extended or adjusted under 35 U.S.C. 154(b) by 48 days.

(21) Appl. No.: 10/051,999

(22) Filed: Jan. 17, 2002

(65) Prior Publication Data

US 2003/0135700 A1 Jul. 17, 2003

(51) Int. Cl.⁷ .............................................. G06F 12/00
(52) U.S. Cl. ....................... 711/154; 711/216; 707/100; 707/205
(58) Field of Search ................................ 711/154, 216; 707/100, 205

(56) References Cited

U.S. PATENT DOCUMENTS 6,389,433 B1 * 5/2002 Bolosky et al. ............. 707/205
6,477,544 B1 * 11/2002 Bolosky et al. ............. 707/200

OTHER PUBLICATIONS

Moulton et al. US PGPUB 2001/0037323, "Hash File System and Method for Use in Commonality Factoring System" Nov. 1, 2001.*

"What is SVCD, CVD/CVCD and XSVCD?", http://www.dvdrhelp.com/svcd.htm.*

* cited by examiner

*Primary Examiner*—Mano Padmanabhan
*Assistant Examiner*—Paul Baker
(74) *Attorney, Agent, or Firm*—Joseph S. Tripoli; Harvey D. Fried; Christine Johnson

(57) ABSTRACT

The invention concerns a method (200) and system (100) for searching for duplicate data. The method (200) includes the steps of: generating (212) at least one identifier from at least one portion of a first segment of data using a unique identifier function; generating (216) at least one identifier from at least one portion of a second segment of data using the unique identifier function; and comparing (220) at least one identifier associated with the first segment of data with at least one identifier associated with the second segment of data to determine whether the first segment of data is substantially identical to the second segment of data.

24 Claims, 2 Drawing Sheets

SYSTEM AND METHOD FOR SEARCHING FOR DUPLICATE DATA

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

The inventive arrangements relate generally to recording systems and more particularly to multimedia recording systems that record digitally encoded signals onto disc media such as hard drives and recordable optical discs.

2. Description of Related Art

Currently, many forms of data can be recorded onto many different types of storage media. As an example, many consumers record television programs or music onto an optical disc medium or a hard disc drive (HDD). As technology has improved, the storage capacity of optical disc media and HDD has significantly increased. In fact, some HDDs can store well over 50 gigabytes of data. As such, a consumer can record a large number of programs or songs on this type of storage medium.

When data is recorded onto a recordable storage medium, the recordable storage medium device typically permits the user to enter a title for purposes of identifying the recorded work. These titles may be useful when the user wishes to locate a particular piece of recorded data to determine whether the user has previously recorded such data. Significantly, however, this process of searching may be laborious, inefficient and prone to errors, as the storage medium may contain hundreds or even thousands of titles. This problem may be particularly acute if the storage medium is a large HDD or if the titles of certain data segments were given default titles.

Even assuming a data segment on a storage medium could be located relatively easily by searching for the title, a particular title may be the same for different data segments. For example, if a song is recorded on a storage medium and is given a title based on the name of the song, a second song can be recorded later that has a name that is identical to the name of the first song. This confusion may occur, for example, if two separate artists record different versions of the same song. When recording the second song, the user may check the titles of the songs previously recorded and may mistakenly assume that the second song has already been recorded. Thus, a need exists for a system and method for searching for duplicate data without increasing system costs or complexity and further reducing the possibility for errors when searching and considering deletion of duplicate data.

SUMMARY OF THE INVENTION

The present invention concerns a method of searching for duplicate data. The method includes the steps of: generating at least one identifier from at least one portion of a first segment of data using a unique identifier function; generating at least one identifier from at least one corresponding portion of a second segment of data using the unique identifier function; and comparing the at least one identifier associated with the first segment of data with the at least one identifier associated with the second segment of data to determine whether the first segment of data is substantially identical to the second segment of data.

In one arrangement, the step of generating at least one identifier from at least one portion of a first segment of data can include the step of generating at least one identifier from the at least one portion of the first segment data using a unique identifier function as the first segment of data is recorded onto a storage medium or after the first segment of data is recorded onto the storage medium. In addition, the step of generating at least one identifier from at least one portion of a second segment of data can include the step of generating the at least one identifier from the at least one portion of a second segment of data using the unique identifier function as the second segment of data is recorded onto the storage medium. Moreover, the step of generating at least one identifier from at least one portion of a second segment of data can occur as the second segment of data is recorded onto a different storage medium.

In one aspect, the first segment of data and the second segment of data can be segments of multimedia data. The method can also include the steps of: storing in a table the at least one identifier associated with the first segment of data; and retrieving from the table the at least one identifier associated with the first segment of data prior to the comparing step. In addition, the method can include the step of presenting an indication that the first segment of data is substantially identical to the second segment of data when at least one identifier associated with the first segment of data matches the at least one identifier associated with the second segment of data.

In another arrangement, the size of the at least one portion of the first segment of data and the at least one portion of the second segment of data can be based on a temporal measurement or a bit measurement. The at least one portion of the first segment of data can correspond temporally or correspond bit by bit with the at least one portion of the second segment of data. In another aspect, the at least one identifier associated with the first segment of data and the at least one identifier associated with the second segment of data can be hash values, and the unique identifier function can be a hash function in which the hash value associated with the first segment of data will equal a hash value associated with the second segment of data when the first segment of data and the second segment of data are identical.

Also, the comparing step can include the step of comparing a plurality of identifiers associated with the first segment of data with a plurality of identifiers associated with the second segment of data to determine whether the first segment of data is substantially identical to the second segment of data. Further, the comparing step can include the step of comparing a plurality of identifiers associated with a first set of segments of data with a plurality of identifiers associated with a second set of segments of data to determine whether the first set of segments of data is substantially identical to the second set of segments of data.

The present invention also concerns a system for searching for duplicate data. The system includes: a controller for reading data from and writing data to a storage medium; and a processor, wherein the processor is programmed to: generate at least one identifier from at least one portion of a first segment of data using a unique identifier function; generate at least one identifier from at least one corresponding portion of a second segment of data using the unique identifier function; and compare the at least one identifier associated with the first segment of data with the at least one identifier associated with the second segment of data to determine whether the first segment of data is substantially identical to the second segment of data. The system also includes suitable software and circuitry to implement the methods as described above.

DETAILED DESCRIPTION OF THE PREFERRED EMBODIMENTS

Figure 1:
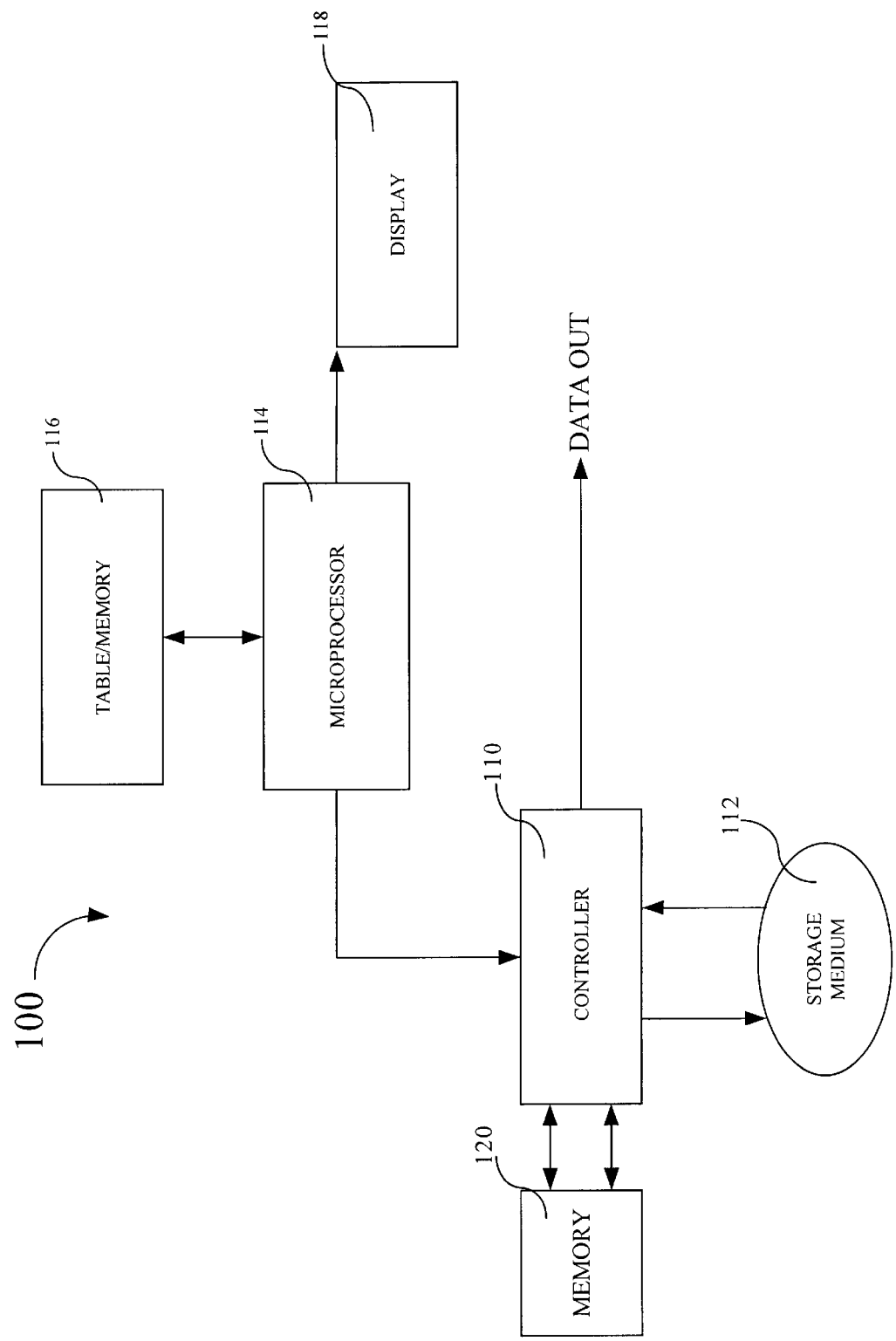
FIG. 1 is a block diagram of a system that can search for duplicate data in accordance with the inventive arrangements herein.

A system 100 for implementing the various advanced operating features in accordance with the inventive arrangements is shown in block diagram form in FIG. 1. The invention, however, is not limited to the particular system illustrated in FIG. 1, as the invention can be practiced with any other system capable of receiving a digitally encoded signal. In addition, the system 100 is not limited to reading data from or writing data to any particular type of storage medium, as any storage medium capable of storing digitally encoded data can be used with the system 100.

The system 100 can include a controller 110 for reading data from and writing data to a storage medium 112. The controller can also read data from and write data to a different storage medium or memory 120. The system 100 can also have a microprocessor 114, a table or memory 116 and a display 118. Control and data interfaces can also be provided for permitting the microprocessor 114 to control the operation of the controller 110 and the display 118 and to retrieve information stored in the table 116. Suitable software or firmware can be provided in memory for the conventional operations performed by the microprocessor 114. Further, program routines can be provided for the microprocessor 114 in accordance with the inventive arrangements. Moreover, any other suitable software or circuitry can be used in place of the microprocessor 114.

In operation, the controller 110 can write a first segment of data to the storage medium 112. In one arrangement, as the first segment of data is recorded to the storage medium 112, the microprocessor 114 can generate at least one identifier from at least one portion of the first segment of data using a unique identifier function. Once the microprocessor 114 generates at least one identifier from the at least one portion of the first segment of data, the microprocessor 114 can transfer this at least one identifier to the table 116. In another arrangement, the at least one identifier associated with the first segment of data can be generated anytime after the first segment of data has been recorded to the storage medium 112.

The microprocessor 114 can also generate at least one identifier for at least one corresponding portion of a second segment of data using the unique identifier function. The microprocessor 114 can generate the at least one identifier associated with the second segment of data as the second segment of data is recorded onto the storage medium 112 or, alternatively, as the second segment of data is recorded in the memory 120. It is understood that the memory 120 can be any suitable form of memory for storing digitally encoded data.

Once generated, the microprocessor 114 can retrieve from the table 116 the at least one identifier associated with the first segment of data. The microprocessor 114 can then compare the at least one identifier associated with the first segment of data to the at least one identifier associated with the second segment of data to determine whether the first segment of data is substantially identical to the second segment of data. If the at least one identifier associated with the first segment of data matches the at least one identifier for the second segment of data, then the first segment of data is substantially identical if not completely identical to the second segment of data. The microprocessor 114 can then present an indication to a user through the display 118 that the two segments of data are identical. The overall operation of the invention will be discussed in greater detail below.

Searching for Duplicate Data

Figure 2:
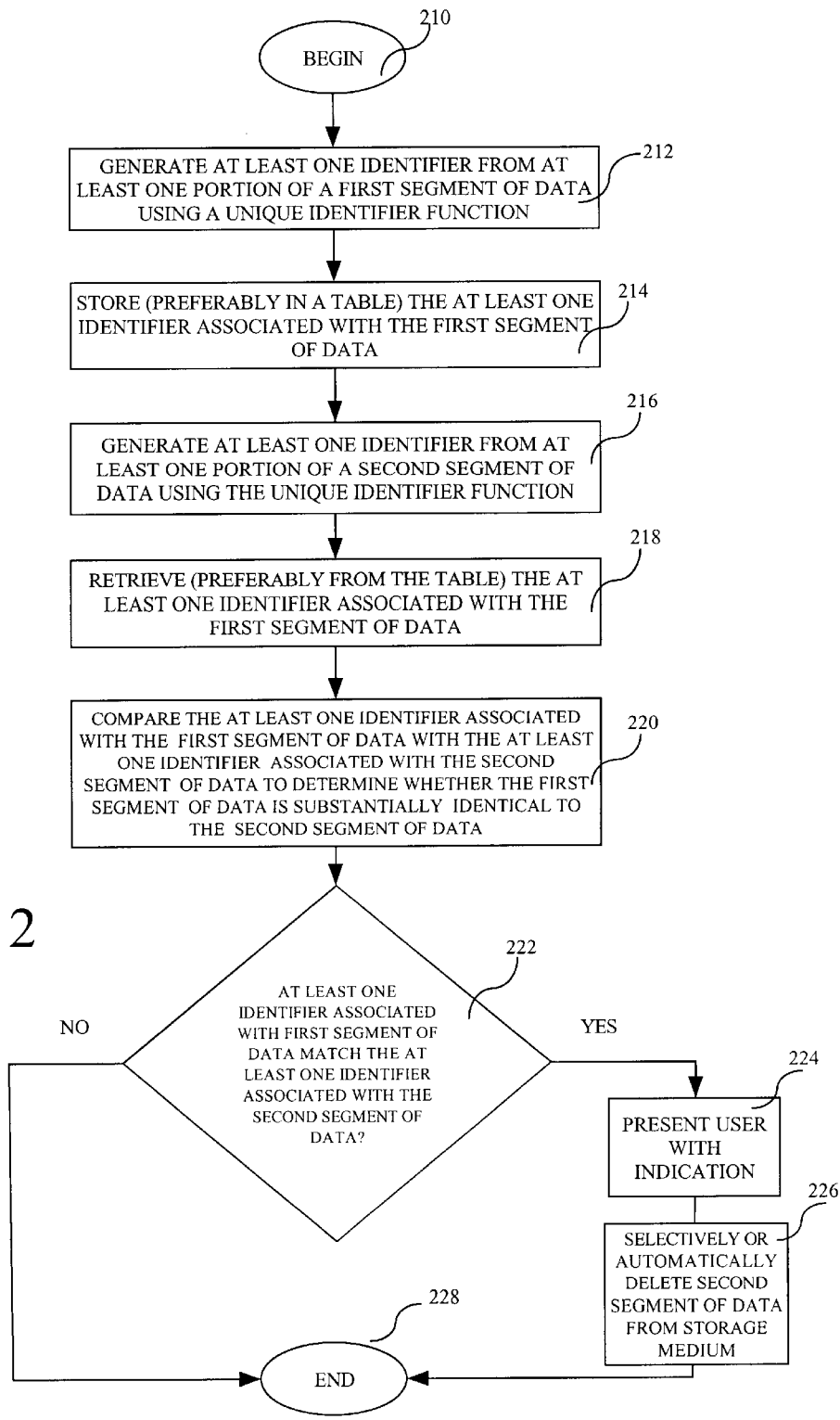
FIG. 2 is a flow chart that illustrates an operation of searching for duplicate data in accordance with the inventive arrangements.

FIG. 2 illustrates a flowchart 200 that demonstrates an operation for searching for duplicate or identical data. At step 210, the process can begin. As shown at step 212, at least one identifier from at least one portion of a first segment of data can be generated using a unique identifier function. The identifier can be generated as the first segment of data is recorded onto a storage medium. Conversely, the identifier can be generated anytime after the first segment of data has been recorded onto the storage medium.

The first segment of data can be any suitable type of data including text-based data, audio, video or any combination thereof or any other suitable form of data. The first segment of data can also be an encrypted or non-encrypted segment of data. Further, an identifier can be generated from any portion of the first segment of data, including non-consecutive or non-successive portions of the first segment of data. Moreover, more than one identifier can be generated from any portion of data contained in the first segment of data. The size of the portion of data from which an identifier is to be generated can be based on a temporal measurement or a bit measurement.

As an example, if the first segment of data is a song, the identifier can be generated from the entire song such that the at least one portion includes the entire first segment of data. As another example, the song can be divided into two discrete portions: a beginning portion and an ending portion. If the size of both of these portions of the song is to be based on a temporal measurement, then the beginning portion can include the first 30 seconds of the song and the ending portion can include the last 30 seconds of the song. According to the inventive arrangements, these two portions of the song can be combined and at least one identifier can be generated from this combination. Thus, one or more identifiers per segment of data can be used for comparison with a corresponding number of identifiers associated with another segment of data.

Continuing with the example, an identifier can be generated from both portions of the song such that two separate identifiers are generated from the same song. Alternatively, an identifier can be generated from the temporal measurement between the beginning and ending portions. Moreover, if the size of the at least one portion of data is based on a bit measurement, then an identifier can be generated from, for example, the first 1 Mb of data in the song. It is noted, however, that the invention is not limited to the foregoing examples, as any number of identifiers can be generated from any number of portions of a first segment (including when the at least one portion includes the entire first segment of data) of any suitable type of data.

Referring back to the flowchart 200, the at least one identifier associated with the first segment of data can preferably be stored in table, as shown at step 214. At step 216, at least one identifier from at least one portion of a second segment of data can be generated using the unique identifier function. The generation of the at least one identifier associated with the second segment of data can be in accordance with the process discussed in relation to the first segment of data (see step 212 discussion). To increase accuracy, however, the portion(s) of the second segment of data from which the at least one identifier is generated can correspond to the at least one portion of the first segment of data. This correspondence can be temporally based or a bit by bit basis.

For example, if the first segment of data is a song and the at least one identifier associated with the first segment of data is generated from the entire song (the at least one portion includes the entire first segment of data), then to maximize accuracy, the at least one identifier associated with the second segment of data can be generated from the entire song (assuming that the second segment of data is indeed a song). As another example, if the at least one portion of the first segment of data includes the first 1 Mb of data and the at least one identifier associated with the first segment is generated from that portion, then it is preferred to generate the at least one identifier associated with the second segment of data from the first 1 Mb of data in the second segment of data.

In one arrangement, the at least one identifier associated with the second segment of data can be generated as the second segment of data is recorded onto the same storage medium onto which the first segment of data was recorded. Conversely, the at least one identifier associated with the second segment of data can be generated as the second segment of data is recorded onto a different storage medium.

At step 218, once the appropriate identifier or identifiers have been generated from the second segment of data, the at least one identifier associated with the first segment of data can be retrieved from memory, preferably the table. At step 220, the at least one identifier associated with the first segment of data can be compared to the at least one identifier associated with the second segment of data to determine whether the first segment of data is substantially identical to the second segment of data. If the identifiers are equal, then the first segment of data is virtually always identical to the second segment of data. At decision block 222, when at least one identifier associated with the first segment of data matches the at least one identifier associated with the second segment, then a user can be presented with an indication that the first segment of data is substantially identical to the second segment of data, as shown at step 224. Further, at step 226, any portion of the second segment of data that was recorded onto a storage medium for purposes of the comparison step can be deleted either selectively by a user or automatically. The process can end at step 228.

In one arrangement, the at least one identifier can be a hash value. In addition, the unique identifier function can be a hash function. A hash value associated with the first segment of data can equal a hash value associated with the second segment of data when the first segment of data and the second segment of data are identical or substantially identical. An example of several hash functions that can be used to practice the invention is an exclusive-or function. It is understood, however, that the invention is not limited to this particular hash function, as any other suitable hash function can be used.

Although the present invention has been described in conjunction with the embodiments disclosed herein, it should be understood that the foregoing description is intended to illustrate and not limit the scope of the invention as defined by the claims.

What is claimed is:

1. A method of searching for duplicate data, comprising the steps of:

generating at least one identifier from at least one portion of a first segment of data;

generating at least one identifier from at least one portion of a second segment of data as said second segment of data is recorded onto a storage medium; and comparing the at least one identifier associated with the first segment of data with the at least one identifier associated with the second segment of data to determine whether the first segment of data is substantially identical to the second segment of data.

2. The method according to claim 1, wherein said step of generating at least one identifier from at least one portion of the first segment of data comprises the step of generating at least one identifier from at least one portion of the first segment data as the first segment of data is recorded onto a storage medium.

3. The method according to claim 2, wherein said step of generating at least one identifier from at least one portion of the second segment of data comprises the step of generating the at least one identifier from at least one portion of the second segment of data as the second segment of data is recorded onto the storage medium.

4. The method according to claim 2, wherein said step of generating at least one identifier from at least one portion of the second segment of data comprises the step of generating at least one identifier from at least one portion of the second segment of data as the second segment of data is recorded onto a different storage medium.

5. The method according to claim 1, wherein said step of generating at least one identifier from at least one portion of the first segment of data occurs after the first segment of data is recorded onto the storage medium.

6. The method according to claim 5, wherein said step of generating at least one identifier from at least one portion of the second segment of data comprises the step of generating the at least one identifier from the at least one portion of the second segment of data using the unique identifier function as the second segment of data is recorded onto a different storage medium.

7. The method according to claim 1, wherein the first segment of data and the second segment of data are segments of multimedia data.

8. The method according to claim 1, further comprising the steps of:

storing in a table the at least one identifier associated with the first segment of data; and retrieving from the table the at least one identifier associated with the first segment of data prior to said comparing step.

9. The method according to claim 1, further comprising the step of presenting an indication that the first segment of data is substantially identical to the second segment of data when at least one identifier associated with the first segment of data matches the at least one identifier associated with the second segment of data.

10. The method according to claim 1, wherein a size of the at least one portion of the first segment of data and the at least one portion of the second segment of data is based on a temporal measurement, wherein the at least one portion of the first segment of data corresponds temporally with the at least one portion of the second segment.

11. The method according to claim 1, wherein a size of the at least one portion of the first segment of data and the at least one portion of the second segment of data is based on a bit measurement, wherein the at least one portion of the first segment of data corresponds bit by bit with the at least one portion of the second segment.

12. The method according to claim 1, wherein the at least one identifier associated with the first segment of data and the at least one identifier associated with the second segment of data are hash values wherein a hash value associated with the first segment of data will equal a hash value associated with the second segment of data when the first segment of data and the second segment of data are identical.

13. The method according to claim 1, wherein said comparing step comprises the step of comparing a plurality of identifiers associated with the first segment of data with a plurality of identifiers associated with the second segment of data to determine whether the first segment of data is substantially identical to the second segment of data.

14. The method according to claim 1, wherein said comparing step comprises the step of comparing a plurality of identifiers associated with a first set of segments of data with a plurality of identifiers associated with a second set of segments of data to determine whether the first set of segments of data is substantially identical to the second set of segments of data.

15. A system for searching for duplicate data, comprising a controller for reading data from and writing data to a storage medium; and a processor coupled to the controller, wherein the processor is programmed to:
   generate at least one identifier from at least one portion of a first segment of data;
   generate at least one identifier from at least one portion of a second segment of data while said second segment of data is recorded onto a storage medium; and
   compare the at least one identifier associated with the first segment of data with the at least one identifier associated with the second segment of data to determine whether the first segment of data is substantially identical to the second segment of data.

16. The system according to claim 15, wherein the processor is further programmed to generate at least one identifier from the at least one portion of the first segment of data as the first segment of data is recorded onto the storage medium.

17. The system according to claim 16, wherein the processor is further programmed to generate the at least one identifier from the at least one portion of the second segment of data as the second segment of data is recorded onto a different storage medium.

18. The system according to claim 15, wherein the processor is further programmed to generate the at least one identifier from the at least one portion of the first segment of data after the first segment of data is recorded onto the storage medium.

19. The system according to claim 18, wherein the processor is further programmed to generate the at least one identifier from the at least one portion of the second segment of data as the second segment of data is recorded onto the storage medium.

20. The system according to claim 18, wherein the processor is further programmed to generate the at least one unique identifier from at least one corresponding portion of the second segment of data as the second segment of data is recorded onto a different storage medium.

21. The system according to claim 15, wherein the first segment of data and the second segment of data are segments of multimedia data.

22. The system according to claim 15, further comprising a table, wherein the processor is further programmed to:
   store in the table at least one identifier associated with the first segment of data; and
   retrieve from the table at least one identifier associated with the first segment of data prior to said comparing step.

23. The system according to claim 15, wherein the processor is further programmed to present an indication that the first segment of data is substantially identical to the second segment of data when at least one identifier associated with the first segment of data matches the at least one identifier associated with the second segment.

24. The system according to claim 15, wherein the at least one identifier associated with the first segment of data and the at least one identifier associated with the second segment of data are hash values wherein the processor determines if a hash value associated with the first segment of data equals a hash value associated with the second segment of data indicative of the first segment of data and the second segment of data being substantially identical.

* * * * *

UNITED STATES PATENT AND TRADEMARK OFFICE
CERTIFICATE OF CORRECTION

PATENT NO. : 6,795,903 B2
DATED : September 21, 2004
INVENTOR(S) : Mark Alan Schultz, Shu Lin and Michael Gene Kelly It is certified that error appears in the above-identified patent and that said Letters Patent is hereby corrected as shown below:

<u>Title page,</u>
Item [73], Assignee, should read
-- [73]   Assignee:       Thomson Licensing S.A.
                          Boulogne-Billancourt (FR) --

Signed and Sealed this

Twenty-fifth Day of January, 2005

JON W. DUDAS
*Director of the United States Patent and Trademark Office*